United States Patent [19]
Tompkins

[11] Patent Number: 5,947,503
[45] Date of Patent: Sep. 7, 1999

[54] FIFTH-WHEEL TRAILER CONNECTOR

[76] Inventor: Ted L. Tompkins, P.O. Box 67, Big Arm, Mont. 59910

[21] Appl. No.: 08/893,056

[22] Filed: Jul. 15, 1997

Related U.S. Application Data

[60] Provisional application No. 60/021,781, Jul. 15, 1996.

[51] Int. Cl.⁶ .................................................. B62D 53/08
[52] U.S. Cl. ..................... 280/455.1; 280/483; 280/901
[58] Field of Search .............................. 280/405.1, 406.1, 280/406.2, 407.1, 455.1, 456.1, 425.2, 901, 483, 484, 488

[56] References Cited

U.S. PATENT DOCUMENTS

| | | | |
|---|---|---|---|
| 3,955,831 | 5/1976 | Whitechurch | 280/432.1 |
| 3,993,325 | 11/1976 | Gravett | 280/415.1 |
| 4,411,444 | 10/1983 | Holloway | 280/405.1 |
| 5,482,309 | 1/1996 | Hollis | 280/423.1 |
| 5,785,341 | 7/1998 | Fenton | 280/441 |

*Primary Examiner*—Kevin Hurley
*Attorney, Agent, or Firm*—Richard C. Conover

[57] ABSTRACT

An apparatus for acting as a shock absorber for a truck towing a vehicle mated with a fifth-wheel, or a gooseneck, hitch. A fifth-wheel, or gooseneck, trailer has members extending away from the trailer bed and converging. A cylindrical housing, having a longitudinal axis aligned substantially perpendicular to the bed of the trailer, is attached to the members at the end where they converge. A kingpin, having a fifth-wheel, or gooseneck, connector, is coaxially mounted in the housing. A lever, having a fee end, extends from the kingpin over the rear of the truck. A resilient means, extending between the free end and the rear of the truck, bias the rear of the truck toward the free end. With this structure as the distance between the free end and the rear of the truck increases, additional bias is place on the rear of the truck tending to raise the rear of the truck. The resilient means thus acts as a shock absorber.

4 Claims, 3 Drawing Sheets

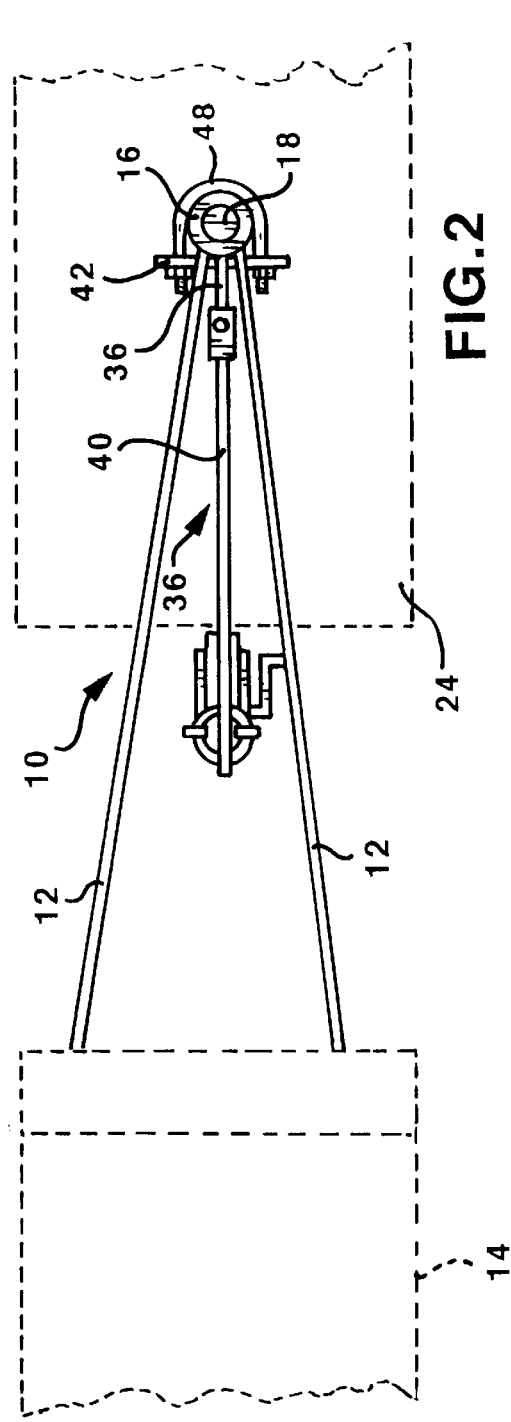
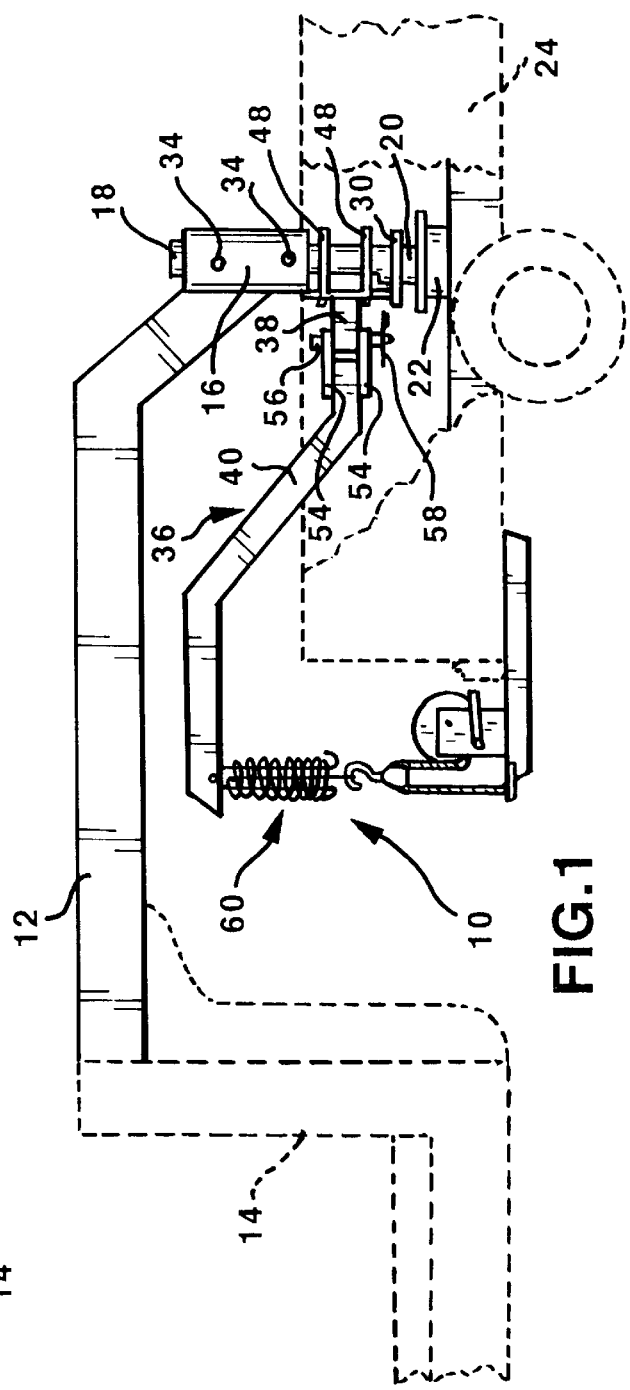

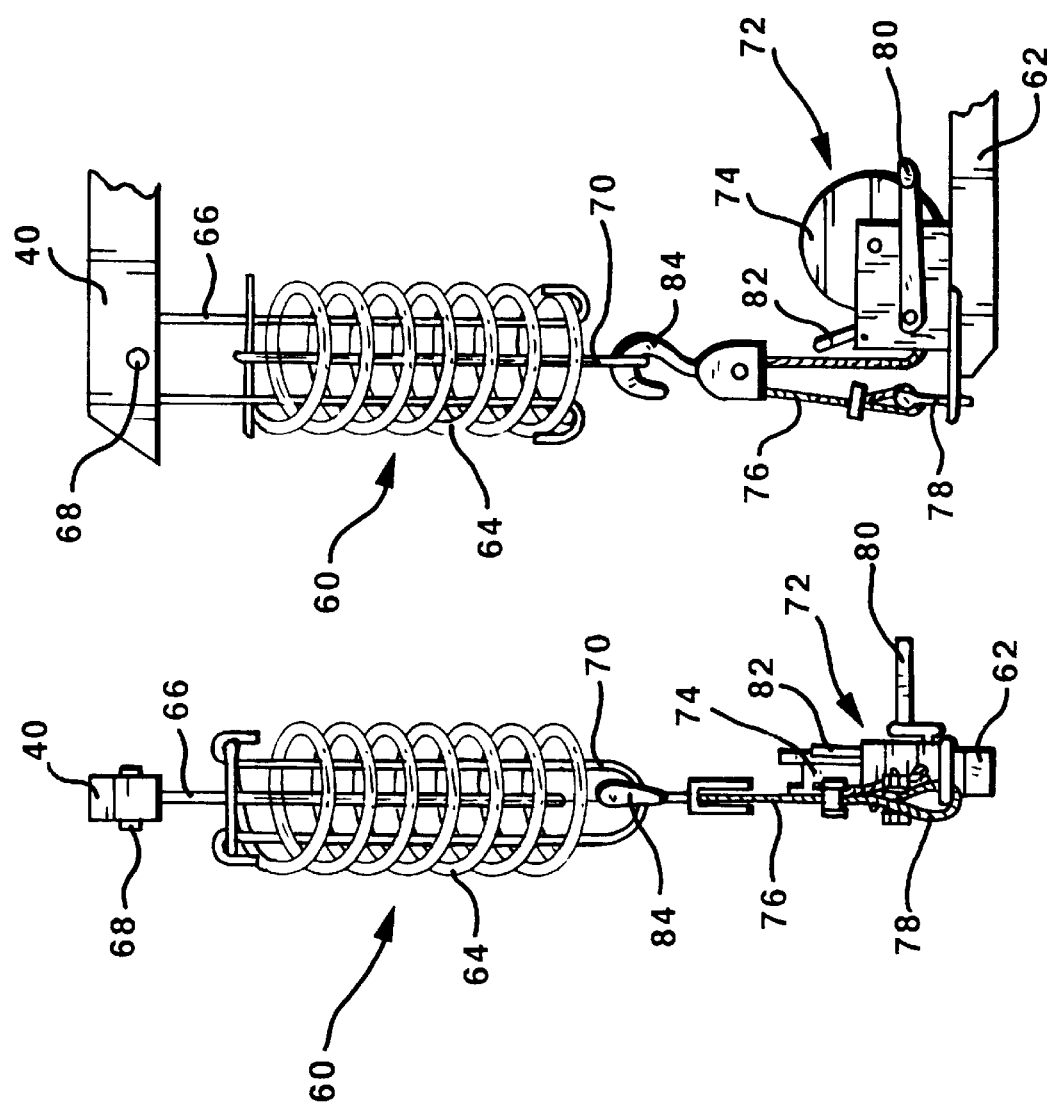

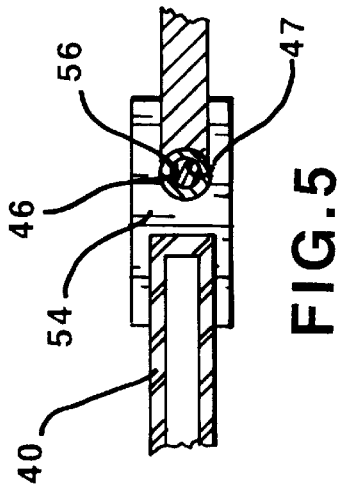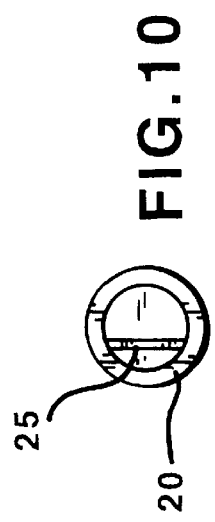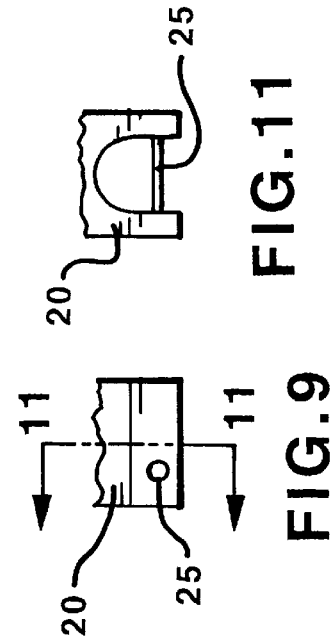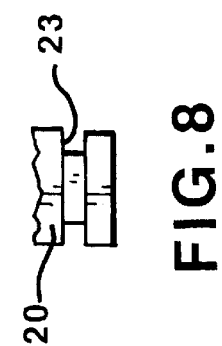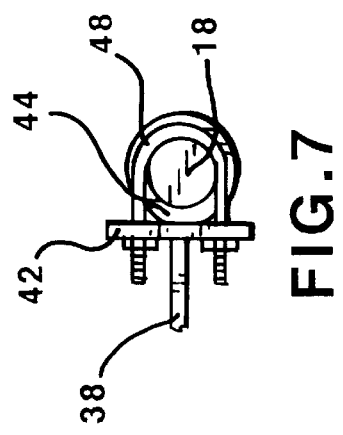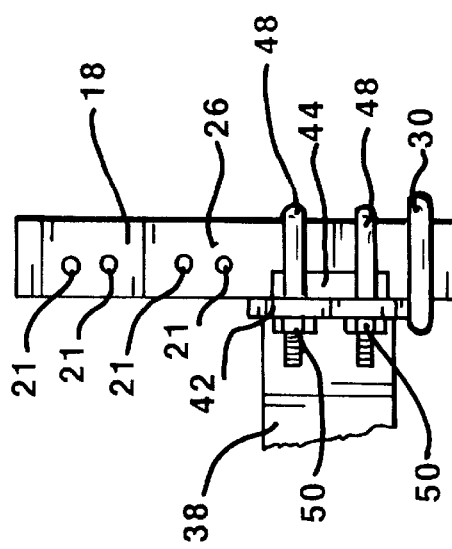

FIFTH-WHEEL TRAILER CONNECTOR

This is a prov. appl. of Ser. No. 60/021781 filed Jul. 15, 1996.

BACKGROUND OF THE INVENTION

This invention relates to a connector for use with a vehicle having a fifth-wheel, or gooseneck, hitch.

When a vehicle tows a fifth-wheel or gooseneck trailer, and the vehicle drops into a hole or rut in the road, the vehicle experiences a hard bounce. This is because the trailer tongue is exerting a downward force on the trailer hitch equal to the tongue weight. The towing vehicle reacts as if a load, equal to the tongue weight, is in the bed of the vehicle whenever the towing vehicle hits a rut or hole.

In the past their have been several trailer hitches described that have sought to overcome the hard ride problem, although these descriptions addressed different hitches with different couplings than the present invention. In U.S. Pat. No. 4,304,419, an earthmoving tractor-trailer combination uses an additional link to strengthen the coupling to prevent the forward edge of the trailer from bouncing toward the ground whenever the tractor hits a hole or rut. U.S. Pat. Nos. 3,194,584 and 3,441,291 address the problem of towing a towed vehicle using a ball hitch attached at the rear of the towing vehicle. These inventions are representative of devices which use torsion bars to overcome the tendency for the trailer hitch to drop whenever the towing vehicle drops into a rut or hole.

None of the above patents describe a structure that can be used with a fifth-wheel, or gooseneck, trailer connector which can be mated with a fifth-wheel hitch, or gooseneck ball, mounted in the bed of a truck. What is needed is a device which can be used with a fifth-wheel or gooseneck connector which can be used to dampen shocks as a towing truck drops into a hole or rut.

SUMMARY OF INVENTION

The present invention relates to apparatus which softens the ride of a towing truck when pulling a trailer having a fifth-wheel, or gooseneck, trailer hitch connector.

A trailer having a fifth-wheel, or gooseneck, connector has a pair of members extending from the trailer and converging at the other end. These members are attached to a cylindrical housing, having a longitudinal axis, where the members converge. The longitudinal axis is oriented substantially perpendicularly to the bed of the trailer.

An elongate, cylindrical kingpin is coaxially mounted and connected to the housing. At a lower end the kingpin has a space below the housing before a lip extends from the kingpin. Below the lip, the kingpin terminates in either a fifth-wheel connector, or a gooseneck connector as appropriate for mating with a fifth-wheel, or gooseneck, hitch.

A stub, having a fixed end and a pivotal connection at the other end, has its fixed end connected to the kingpin in the space above the lip. An arm has one end pivotally connected to the pivotal connection end of the stub. The other end of the arm, the free end, is free to pivot about the stub in a rotational plane. If a force is applied to the arm orthogonal to the rotational plane, however, the arm can exert pressure to rotate the kingpin.

A resilient means is attached between the free end of the arm and the rear of the towing truck to bias the free end toward the truck, in a plane substantially orthogonal to the rotational plane. As the rear wheels of the truck drop into a hole, the kingpin, attached to the trailer, remains oriented substantially the same as before the rear wheels dropped. But the distance between the free end and the rear of the truck is increased with the dropping of the truck's rear wheels.

In this situation, the resilient means places an additional bias on the rear of the truck tending to lift the rear of the truck. Then as the truck rolls out of the hole further along the road, the movements are reversed. The free end remains substantially oriented as it was before the drop of the rear wheels, but the rear of the truck rises out of the hole. This reduces the bias that was recently increased. The resilient means thus acts as a shock absorber.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 1 is an elevational view of a connector for a fifth-wheel trailer according to the present invention;

FIG. 2 is a plan view of the connector shown in FIG. 1;

FIG. 3 is an enlarged, elevational view of a spring mechanism shown in FIG. 1;

FIG. 4 is a left side view of the spring mechanism shown in FIG. 3;

FIG. 5 is an enlarged, cross-sectional view taken along the line 5—5 in FIG. 1;

FIG. 6 is an enlarged, elevational view of a kingpin and stub shown in FIG. 1;

FIG. 7 is a plan view of the kingpin and stub shown in FIG. 6;

FIG. 8 is an elevational view of a fifth-wheel extension shown in FIG. 1;

FIG. 9 is an elevational view of a gooseneck extension shown FIG. 1;

FIG. 10 is a bottom view of the gooseneck extension shown in FIG. 9; and

FIG. 11 is a cross-sectional view of the gooseneck extension taken along the line 11—11 in FIG. 9.

DESCRIPTION OF A PREFERRED EMBODIMENT

A preferred embodiment of the fifth wheel trailer connector 10 is shown in FIG. 1 for use with a conventional, fifth-wheel or gooseneck, trailer-hitch assembly. A conventional trailer tongue has a pair of members 12 rigidly attached to the bed of a trailer 14 at one end. Members 12 converge at the other end, as best seen in FIG. 2, to attach to and hold an elongate, cylindrical housing 16 having a longitudinal axis. The longitudinal axis of housing 16 is aligned substantially perpendicular to the trailer bed. In addition as best seen in FIG. 1, housing 16 has holes 34 bored therethrough which are aligned substantially perpendicular to the longitudinal axis.

An elongate, cylindrical kingpin 18, coaxially mounted within housing 16, has a grooved, solid extension 20 at the lower end for mating with a conventional fifth-wheel, or gooseneck, trailer hitch 22, located in the bed of a truck 24. Jaws in a conventional fifth-wheel trailer hitch 22 fit within groove 23, best seen in FIG. 8, to prevent solid extension 20 from raising out of the trailer hitch.

As an alternative to the fifth-wheel hitch shown in FIG. 1, gooseneck trailer connectors 10 have an end of extension 20 hollowed-out for receiving a ball-type connector as best seen in FIGS. 9–11. These trailer connectors 10 ride on a conventional trailer hitch ball mounted in the bed of truck 24. In this latter instance, extension 20 is pinned to the hitch ball by using a bolt 25 that passes through the sides of extension 20 and under the ball to prevent the extension from raising off the conventional ball hitch.

As best seen in FIG. 6 above both types of extension 20, a lip 30 extends away from kingpin 18. Adjacent the upper portion of kingpin 18, a series of holes 21 are bored through the kingpin substantially perpendicular with the longitudinal axis. As best seen in FIG. 1, kingpin 18 can then be slipped into housing 16 with extension 20 and lip 30 extending below the housing. With trailer 14 and truck 24 nearly level, kingpin 18 can then be slid up or down within housing 16 so as to align a pair of holes 21 with holes 34. When holes 34 and a pair of holes 21 line up, the kingpin can then be secured to the housing by passing pins (not shown) through aligned holes 34 and holes 21 in the kingpin.

A lever 36 has two components: a stub 38, which is fixedly attached to kingpin 18, and an arm 40 which can freely pivot about stub 38 in one plane but which can provide leverage to rotate the stub in an orthogonal plane.

Stub 38 is connected to kingpin 18 to form a fixed end for lever 36. At one end stub 38 has a rectangular, plate 42 attached substantially perpendicular to the sides of stub 38. On a side of plate 42 opposite stub 38, a saddle 44, curved to fit kingpin 18, is attached to the plate as by welding. Four bolt holes are drilled through rectangular, plate 42—one hole adjacent to each of the four corners. As best seen in FIG. 6, stub 38 can then be fixedly mounted to kingpin 18 by placing plate 42 and saddle 44 adjacent the rear of kingpin 18 and just above lip 30. U-bolts 48 are then placed around kingpin 18 and through corresponding bolt holes in plate 42. Nuts 50, placed on each U-bolt 48, are tightened to securely hold stub 38 to kingpin 18 and to securely fix this end of lever 36. Lip 30 prevents this end of lever 36 from riding down on kingpin 18 as the present invention is being used. Adjacent the other end of stub 38 as best seen in FIG. 5, a pipe 46, having a central bore 47 aligned substantially perpendicular with the longitudinal axis of kingpin 18, is welded to the stub.

The other portion of lever 36 is arm 40 which provides leverage in a direction orthogonal to a rotational plane. Arm 40 is pivotally connected to stub 38 at one end and shaped to extend over the rear of truck 24 toward the other, free end. The free end is permitted easy swinging movement within the rotational plane around the pivotal connection. At the pivotally connected end of arm 40, plates 54 are attached on opposite sides of the arm and are sized to extend on opposite sides of stub 38 as best seen in FIG. 1. Coupling holes are drilled in plates 54 to mate with the corresponding central bore 47 of pipe 46. The centerlines of the coupling holes and central bore 47 are substantially aligned with each other and with the longitudinal axis of kingpin 18. A coupling pin 56 is then inserted through the coupling holes and corresponding central bore 47 to permit arm 40 to pivot about coupling pin 56 as best seen in FIG. 5. As shown in FIG. 1, a cotter key 58 is placed through coupling pin 56 to hold the pin in its inserted position. Arm 40 can thus transfer forces acting away from or toward the ground to stub 38, but at the same time the arm is free to swing about coupling pin 56. The free end of arm 40 thus forms the free end of lever 36. The free end of lever 36 in this configuration can be used to rotate the longitudinal axis of kingpin 18.

At the free end of lever 36, a spring mechanism 60 is attached. Spring mechanism 60 is used to bias the rear of truck 24 upward. As best seen in FIGS. 3 and 4, spring mechanism 60, at one end, is attached to arm 40 and, at the other end, is attached to a hitch bar 62. As best seen in FIG. 1, hitch bar 62 is attached to the rear of truck 24.

As best seen in FIGS. 3 and 4, spring mechanism 60 uses a coiled spring 64. A bent hangar 66 is turned at opposite ends to engage the bottom coils of spring 64 and hold them. Intermediate the ends, bent hangar 66 is looped over pin 68 to prevent the hangar from pulling away from arm 40.

Also an inverted, bent hangar 70 is led through coiled spring 64 in a direction opposite to hangar 66. This permits the turned ends of inverted hangar 70 to grab the top coils of spring 64 and hold them while the looped portion on the inverted hangar extends downward below the coils of the spring as best seen in FIGS. 3 and 4. With this arrangement, as the looped portion of inverted hangar 70 is pulled away from arm 40, the bias of spring 64 increases.

A conventional hand winch 72 is used to place a bias on spring 64. Conventional winch 72 has a pulley 74 with an incorporated hook 84 mounted intermediate the ends of cable 76. At the end of cable 76 capable of being pulled from conventional winch 72, a shackle 78, connected to the cable, can be connected to a ring on conventional hitch bar 62 as shown in FIG. 3 and 4 to hold one end of the cable to the hitch bar. Conventional hand winch 72 is attached to hitch bar 62 in such a way that crank 80 and associated pawl lever 82 are easily accessible to tighten cable 76 when putting a strain on spring 64.

Hook 84, incorporated as part of conventional pulley 74, is placed over the loop of inverted hangar 70 so that as a strain is placed on pulley 74, associated hook 84 can place a bias on spring 64.

In operation, fifth wheel trailer 14 and truck 24 are placed on level ground and kingpin 18 adjusted vertically to align holes 34 and 21. With these holes aligned, kingpin 18 can then be pinned to housing 16. Fifth wheel trailer 14 is then connected to truck 24 by mating extension 20 of kingpin 18 with a conventional fifth-wheel trailer hitch 22, or, if using a gooseneck trailer, by placing ball extension 20 on top of a conventional ball hitch mounted in the bed of truck 24 and then pinning the ball with bolt 25. The free end of arm 40 is connected to the rear of truck 24 by hooking hook 84 into the loop of inverted hangar 70 and tightening cable 76 by using winch 72.

As truck 24 is driven away, trailer 14 trails behind the vehicle with kingpin 18 pulling in trailer hitch 22 in the conventional manner. Conventional fifth-wheel trailer hitch 22, having a mounting base and a grabbing plate, is mounted so that any tilting between the mounting base and grabbing plate occurs around an axis that is substantially parallel with an axle of truck 24. If the rear wheels of truck 24 fall into a hole, the mounting base of trailer hitch 22, fixedly mounted in the bed of the truck, rotates backwardly as the vehicle's rear wheels descend. Kingpin 18, however, remains oriented in housing 16 with substantially the same orientation as before the vehicle's rear wheels started to descended. The distance between the rear of the truck and the free end of lever 36 increases as the rear wheels of the truck drop.

With a gooseneck trailer hitch, kingpin 18 is pulled by a trailer hitch ball mounted in the bed of truck 24. Similarly as the rear wheels of truck 24 drop into a hole, there is rotational movement by kingpin 18 around a ball fixedly mounted in the bed of truck 24. The distance between the rear of the truck and the free end of lever 36 again increases in this situation as the rear wheels of the truck drop.

The increasing separation between the free end of lever 36 and the rear of the truck using either hitch is resisted however. The increasing separation between the free end of lever 36 and the rear of the truck places additional bias on spring 64. Since spring 64 is connected between the rear of truck 24 and arm 40, increasing separation increases the resilient force acting on the rear of truck 24. This tends to raise the rear of the truck 24. Thus spring 64 tries to keep the rear of truck 24 from falling rapidly whenever the rear wheels enter a hole or rut. Because spring 64 acts to counteract the falling of the rear of truck 24 as the rear wheels of the truck drop into a hole, the spring acts as a shock absorber.

As the rear wheels of truck 24 come out of the hole further along a road, kingpin 18 pivots backward in grab plate of trailer hitch 22, or around a gooseneck trailer hitch ball, to become more nearly vertically oriented to the truck bed. In this situation, the free end of arm 40 pivots closer to truck 24. With a decreased separation between the free end of arm 40 and the rear of truck 24 now occurring, the resilient force recently increased is now relaxed.

If truck 24 turns with a trailer 14 connected, stub 38 will remain directly beneath members 16, while arm 40 will pivot around coupling pin 56 so that its free end will remain nearly over hitch bar 62. The two ends of lever 36 thus respond differently: one end follows the motion of the turn, and the other end barely responds to the motion. Stub 38 is short enough that spring mechanism 60, connected to the free end of arm 40, will remain clear of the bed of truck 24 even though coupling pin 56 is being rotated closer to the front of the truck. Since the top of spring mechanism 60 is moving closer to the front of truck 24, the effect will be to slightly change the bias of spring 64.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A shock-absorbing connector for mating a fifth-wheel trailer with a conventional fifth-wheel hitch mounted in a bed of a truck having a forward end and a rear end, the connector comprising:

an elongate kingpin, connected to the trailer in a depending relation in a normally vertical position, the kingpin having a longitudinal axis and an exposed, grooved extension for mating with the conventional fifth-wheel hitch;

a rigid lever arm, having one end free and the other end connected in perpendicular relation to the kingpin; and a biasing means, connected between the free end and the rear of the truck, for biasing the rear of the truck toward the free end.

2. A shock-absorbing connector for mating a gooseneck trailer with a conventional ball hitch mounted in a bed of a truck having a forward end and a rear end, the connector comprising:

an elongate kingpin, connected to the trailer in a depending relation in a normally vertical position, the kingpin having a longitudinal axis and an exposed, hollowed-out extension for mating with the conventional ball hitch;

a rigid lever arm, having one end free and the other end connected in perpendicular relation to the kingpin; and a biasing means, connected between the free end and the rear of the truck, for biasing the rear of the truck toward the free end.

3. A shock-absorbing connector, attached to members extending from a fifth-wheel trailer, in combination with a conventional fifth-wheel hitch mounted in a bed of a truck having a rear end, the connector comprising:

an elongate housing having a longitudinal axis, the housing connected in depending relation to the members with the longitudinal axis substantially perpendicular to the bed of the trailer;

an elongate kingpin, coaxially held by the housing, having an exposed, grooved extension for mating with the conventional fifth-wheel hitch;

a stub rigidly attached to the kingpin at one end and, at the other end, having a pivotal connection whose pivotal axis is substantially aligned with the longitudinal axis of the housing;

a rigid lever arm pivotally connected to the pivotal connection at one end and having a free end at the other end; and a biasing means, connected between the free end and the rear end of the truck, for biasing the rear end of the truck toward the arm.

4. A shock-absorbing connector, attached to gooseneck members extending from a fifth-wheel trailer, in combination with a conventional ball hitch mounted in the bed of a truck having a rear end, the connector comprising:

an elongate housing having a longitudinal axis, the housing connected in depending relation to the members with the longitudinal axis substantially perpendicular to the bed of the trailer;

an elongate kingpin, coaxially held by the housing, having an exposed, hollowed-out extension for mating with the conventional ball hitch;

a stub rigidly attached to the kingpin at one end and, at the other end, having a pivotal connection whose pivotal axis is substantially aligned with the longitudinal axis of the housing;

a rigid lever arm pivotally connected to the pivotal connection at one end and having a free end at the other end; and a biasing means, connected between the free end and the rear end of the truck, for biasing the rear end of the truck toward the arm.

* * * * *